(12) United States Patent
Haussecker et al.

(10) Patent No.: US 6,373,365 B1
(45) Date of Patent: Apr. 16, 2002

(54) HOLLOW MAGNET BODY FOR DETECTING A ROTATION OF A SHAFT

(75) Inventors: Walter Haussecker, Buehlertal; The-Quan Pham, Buehl; Kurt Schindler, Achern-Oensbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,481

(22) PCT Filed: Apr. 17, 1999

(86) PCT No.: PCT/DE99/01157

§ 371 Date: Apr. 10, 2000

§ 102(e) Date: Apr. 10, 2000

(87) PCT Pub. No.: WO99/61921

PCT Pub. Date: Dec. 2, 1999

(30) Foreign Application Priority Data

May 19, 1998 (DE) .......................................... 198 23 640

(51) Int. Cl.$^7$ ................................................. H01F 7/02

(52) U.S. Cl. ...................................................... 335/302
(58) Field of Search .......................... 335/179, 229–234, 335/205–207, 302, 303; 310/152–156; 324/207.11–207.26

(56) References Cited

U.S. PATENT DOCUMENTS 4,835,505 A * 5/1989 Hattori et al. ............... 335/302

* cited by examiner

Primary Examiner—Ramona M. Barrera
(74) Attorney, Agent, or Firm—Ronald E. Greigg

(57) ABSTRACT

A hollow magnet body with an annular auxiliary body and produces them as a combined component using an injection molding process. In this connection, an inner diameter of the annular auxiliary body is embodied as greater than a diameter of the associated shaft so that a tubular section extends out from the material of the hollow magnet body between this shaft and the annular auxiliary body and is suited for the production of a press fit. As a result, the annular auxiliary body made of metal supplies the main component of the pressing forces, thus counteracting the danger of the hollow magnet body splitting.

9 Claims, 1 Drawing Sheet

HOLLOW MAGNET BODY FOR DETECTING A ROTATION OF A SHAFT

PRIOR ART

European Patent Disclosure EP 0 601 228 B1 has disclosed a device for detecting rotations of a shaft which, for example, is an armature shaft of an electric motor of a window lifter or sliding sunroof adjuster. The device in this case is comprised of an essentially hollow, cylindrical magnet body, which as a result of its magnetization, acts as a magnet wheel, and at least one stationary sensor, in this instance a Hall sensor for example, which is disposed resting at a minimum distance from the magnet body. Sometimes an induction coil, for example, can be used instead of a Hall sensor. For example, the hollow magnet body is made of magnetizable particles that are available in the form of powder and a bonding of thermoplastic material. In this instance, the percentage of powder made up of magnetizable particles is chosen to be as great as possible so that the hollow magnet body formed using the injection molding process on the one hand permits the clearest possible signals to be triggered in the sensor, but on the other hand is disadvantageously brittle as a result. Therefore the magnet body is given an inner diameter which, in combination with the diameter of the shaft, produces a sliding seat and the magnet body is glued to the shaft. It must be viewed as disadvantageous that the glue contains solvents and/or other chemicals and requires a disadvantageously long time to harden, for which purpose the glue may possibly also have to be irradiated with ultraviolet light.

European Patent Disclosure EP 0 601 228 B1 also teaches the avoidance of gluing the hollow magnet body to the shaft through the use of a securing piece, which, paired with the shaft, constitutes a press fit pairing and is designed for the transmission of torque from the shaft to the hollow magnet body. In this instance, the transmission takes place through positively engaging means. To this end, the securing piece is embodied, for example, as essentially annular with axially protruding, resilient arms which have hooks on their free ends and extend through grooves provided in the hollow magnet body. This securing piece is injection molded in one piece out of thermoplastic material together with the arms and the hooks. This has the advantage that in the event of a movement of the securing piece on the shaft occurring under pressure, the danger of a damage to the surface of the shaft is slight. A surface of this kind can therefore also constitute a slide pairing, for example, with a sintered bronze coating. Another exemplary embodiment has an annular disk made of metal, e.g. brass, as a first securing piece, which is fixed to the shaft by means of a press-fitting, and a second securing piece which, as a sheet metal part with elastic securing arms, serves to couple the hollow magnet body, which is provided with longitudinal grooves on the outside, to the annular disk. According to the European Patent Disclosure EP 0 611 228 B1, a hollow magnet body and its associated, at least one securing body can be preassembled into one structural unit and can be slid as a structural unit onto the shaft and press-fitted.

ADVANTAGES OF THE INVENTION

The hollow magnet body according to the invention, has an advantage that despite the rigidity of the material used, the magnet body can be pressed onto the shaft carrying the magnet body in order to produce a frictional connection between the shaft and the hollow magnet body. As a result, the annular auxiliary body which encompasses the magnet body in the vicinity of the press pairing protects the hollow magnet body from splitting. Furthermore, with this construction, it is also advantageous that the material which slides when the hollow magnet body is being pressed on, thanks to its thermoplastic bonding, stresses and jeopardizes the surface of the shaft less than an annular disk made of metal according to the prior art. Therefore, the shaft can advantageously have one and the same diameter for receiving the hollow magnet body and for being supported in a slide bearing bush, as a result of which the shaft can be inexpensively manufactured.

Advantageous improvements and updates of the hollow magnet body are possible by means of the measures taken.

The features set forth produce an advantage that despite the disposition of the annular auxiliary body, a lot of end face area is available for the pressing-on of the hollow magnet body, even if the longitudinal section of the hollow magnet body encompassed by the annular auxiliary body is embodied as relatively thin-walled for the sake of improved radial elasticity.

Other features set forth produce an exemplary embodiment in which the hollow magnet body and the annular auxiliary body as well can be manufactured separately in order to be subsequently united with one another.

Still other features produce a advantage that the longitudinal section of the hollow magnet body enclosed by the annular auxiliary body is particularly well-suited in the radial direction for producing the radial press fit with the shaft.

Characterizing features set forth produce an advantage that the annular auxiliary body and the hollow magnet body constitute a combined piece that can be produced in an injection mold and can be slid and press-fitted onto the shaft.

Still other features of claim 6 produce an advantage of an improved positional fixing of the hollow magnet body on the shaft, even with varying operating temperatures.

BRIEF DESCRIPTION OF THE DRAWING

Two exemplary embodiments of the invention are shown in the drawing and will be explained in detail in the subsequent description.

DESCRIPTION OF THE EXEMPLARY EMBODIMENTS

Figure 1:
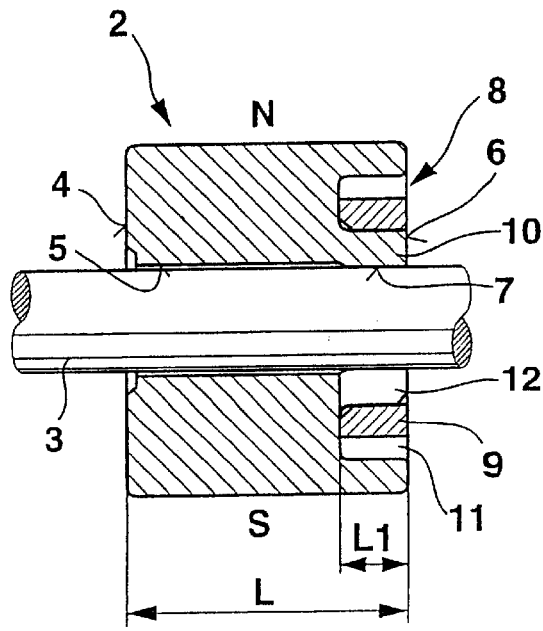
FIG. 1 is a longitudinal section through a first exemplary embodiment of the invention.

The first exemplary embodiment of a hollow magnet body 2 is designed to encompass the shaft 3 with a press fit so that rotations and rotational accelerations of this shaft 3 result in equal-magnitude rotations and rotational accelerations of the hollow magnet body 2.

For example, the hollow magnet body 2 is embodied as externally cylindrical over its entire length L and starting from one end face 4, has a round opening 5, which is comparable to a bore, wherein a diameter of this round opening 5 is slightly greater than a diameter of the shaft 3. This is so that an end of the shaft 3, not shown, can be slid into this round opening 5 in order to prevent radial stresses in the hollow magnet body 2 in the vicinity of the round opening 5.

This round opening 5 is adjoined axially, and thus in the direction of a second end face 6, in a coaxial fashion by another round opening 7. In the depicted pairing of the shaft 3 and the hollow magnet body, the hollow magnet body 2 forms a press fit with the shaft 3 in the vicinity of the round opening 7.

Starting from the end face 6, the hollow magnet body 2 has an axial annular groove 8. An annular auxiliary body 9 is disposed in the axial annular groove 8. Because a diameter of the body 9 is greater than the diameter of the shaft 3, the annular auxiliary body 9 encompasses a longitudinal section L1 of the hollow magnet body 2. As a result, a tubular section 10 of the hollow magnet body 2 is disposed between the annular auxiliary body 9 and the shaft 3. Radially outside the annular auxiliary body 9, there is a radial gap 11 in relation to the hollow magnet body 2.

The hollow magnet body 2, with the first round opening 5, the second round opening 7, and the axial annular groove 8, can be produced independently of the production of the auxiliary body 9. In a manner adopted, for example, from the prior art, the hollow magnet body 2 is manufactured as an injection molded part out of permanently magnetizable particles and a thermoplastic bonding. The magnetizable particles can be a ferrite powder. The thermoplastic bonding can, for example, be comprised of polyethylene. In the current example, the hollow magnet body 2 is magnetized in such a way that it has a north pole "N" on the circumference and has a south pole "S" disposed diametrically opposite this.

The annular auxiliary body 9 is made of metal and in this connection is preferably made of a metal which has a thermal expansion coefficient that is equal to the thermal expansion coefficient of the material of the shaft 3. In the exemplary embodiment, the annular auxiliary body 9 is united with the hollow magnet body 2 before the hollow magnet body 2 is slid onto the shaft 3. In this connection, an inner diameter of the annular auxiliary body 9 and an outer diameter of the tubular section 10 of the hollow magnet body 2 are respectively provided with a diameter such that at the latest, starting from when the tubular section 10 is pressed onto the shaft 3, the annular auxiliary body 9 exerts radial pressure on the tubular section 10. This pressure encourages the production of the press fit mentioned above. In this connection, it is advantageous that the elastic modulus of the metallic material of the annular auxiliary body 9 differs from the elastic modulus of the material of the hollow magnet body 2 in such a way that the pressure of the tubular section 10 against the shaft 3 is predominantly exerted by the annular auxiliary body 9. To this extent, a radial deformation of the tubular section 10 need only be relatively small in order to achieve the desired pressure against the shaft 3. Circumferential stresses in the tubular section 10 that occur during the process of being pressed on are correspondingly slight, which results in the desired reduction in the danger of a fracturing of the tubular section 10 when being pressed onto the shaft 3.

Figure 2:
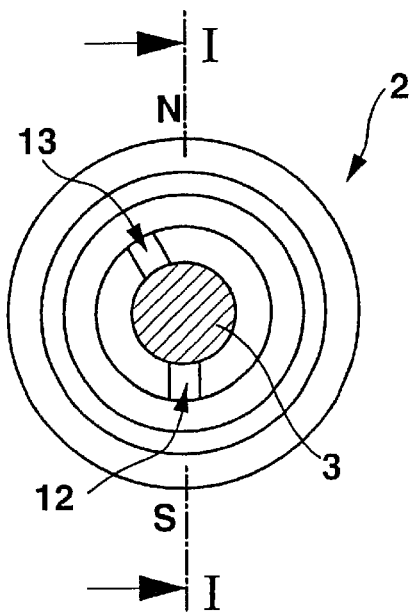
FIG. 2 is an end view of the invention according to FIG. 1.

In order to at least limit circumferential stresses occurring in the tubular section 10 during the process of being pressed on, shaft the tubular section 10 can be interrupted, for example twice, on the circumference by means of the disposition of radial slits 12, 13 in a manner that can be seen particularly clearly in FIG. 2. The subsections of the tubular section 10 thus produced therefore resemble the design of split chucks that are known in machining technology and are for tools such as end-milling cutters or the like. A further description of the interrelationships in this regard is unnecessary.

Figure 3:
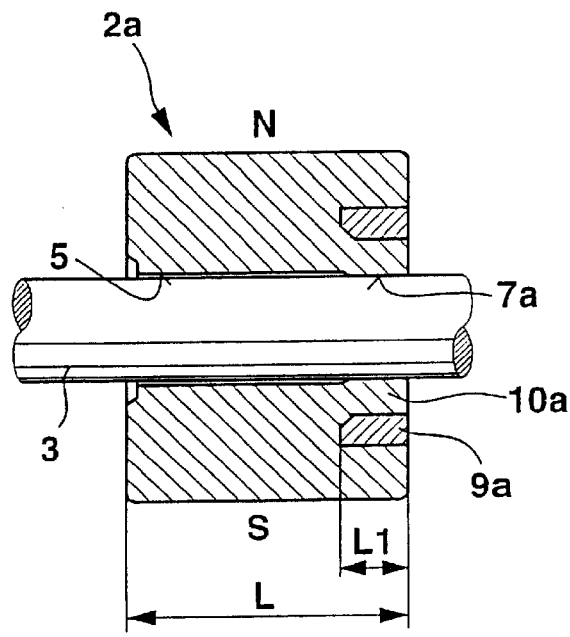
FIG. 3 is a longitudinal section through a second exemplary embodiment of the invention.

The second exemplary embodiment according to FIG. 3 of a hollow magnet body 2a differs from the first exemplary embodiment according to FIGS. 1 and 2 by virtue of the fact that an annular auxiliary body 9a in the form of a reinforcing insert is accommodated in the hollow magnet body 2a, which is in turn embodied as an injection molded body. The hollow magnet body 2a in turn has the length L, for example, whereas a longitudinal section L1 is provided for the axial extension of the annular auxiliary body 9a. The hollow magnet body 2a in turn has a round opening 5, which is shorter than the above-mentioned length L, wherein the round opening 5 has a diameter that is greater than the diameter of the shaft 3 in order to produce a sliding seat. A round opening 7a is provided, whose diameter on the injection-molded component is smaller here than the diameter of the shaft 3. In this connection, the diametrical difference and an expansion of the annular auxiliary body 9a produced when the hollow magnet body 2a is pressed onto the shaft 3 are the main reasons for the production of the desired press fit. For the second exemplary embodiment according to FIG. 3, the reference numeral 9a has therefore been selected for the annular auxiliary body because due to the fact that it is extrusion coated with the material of the hollow magnet body 2a, it can be manufactured with coarser tolerances than the annular auxiliary body 9 of the first exemplary embodiment according to FIGS. 1 and 2. This results in the advantage that the exemplary embodiment according to FIG. 3 can be produced more cheaply.

According to the European Patent Disclosure EP 0 601 228 B1 mentioned in the introduction to the specification, the shaft 3 can be a motor shaft of an electric motor. The use of the hollow magnet bodies 2, 2a according to the invention, with their annular auxiliary bodies 9, 9a, however, is not limited to being installed in such an electric motor. On the contrary, hollow magnet bodies 2, 2a can also be mounted, for example, on drive shafts and rotating axles of sprockets or the like. It is thus clear that the invention is directed toward producing a press fit between hollow magnet bodies 2, 2a and shafts 3 and in addition, toward preventing damage in the sense of a splitting of this hollow magnet body when the press fits are being produced.

The foregoing relates to a preferred exemplary embodiments of the invention, it being understood that other variants and embodiments thereof are possible within the spirit and scope of the invention, the latter being defined by the appended claims.

We claim:

1. A hollow magnet body (2, 2a), which is comprised of permanently magnetizable particles and a thermoplastic bonding, in order to detect rotations of a shaft (3) supporting the hollow magnet body (2, 2a), an annular auxiliary body (9, 9a) for transmitting torque from the shaft (3) to the hollow magnet body (2, 2a) is provided, the inner diameter of the annular auxiliary body (9, 9a) is greater than an associated diameter of the shaft (3), that the annular auxiliary body (9, 9a) encloses a longitudinal section (L1) of the hollow magnet body (2, 2a) in such a way that the longitudinal section (L1) is pressed radially onto the shaft (3) when mounted on the shaft (3), in which starting from one end face (6), the hollow magnet body (2) has an annular groove (8) in which the annular auxiliary body (9) is accommodated.

2. The hollow magnet body according to claim 1, in which the hollow magnet body (2), by means of the annular groove (8), forms a longitudinal section (L1) that is embodied in the form of a tubular section (10) that is press fit onto the shaft (3).

3. The hollow magnet body according to claim 2, in which in a vicinity of the longitudinal section (L1), the tublar section (10) has at least one radial slit (12, 13) passing through the tubular section.

4. The hollow magnet body with an annular auxiliary body according to claim 1, in which the hollow magnet body (2a) is embodied as an injection molded body that contains the annular auxiliary body (9a) as a reinforcing element.

5. A hollow magnet body (2, 2a), which is comprised of permanently magnetizable particles and a thermoplastic bonding, in order to detect rotations of a shaft (3) supporting the hollow magnet body (2, 2a), an annular auxiliary body (9, 9a) for transmitting torque from the shaft (3) to the hollow magnet body (2, 2a) is provided, the inner diameter of the annular auxiliary body (9, 9a) is greater than an associated diameter of the shaft (3), that the annular auxiliary body (9, 9a) encloses a longitudinal section (L1) of the hollow magnet body (2, 2a) in such a way that the longitudinal section (L1) is pressed radially onto the shaft (3) when mounted on the shaft (3), in which the annular auxiliary body (9, 9a) is comprised of metal that has a thermal expansion coefficient that is equal to a thermal expansion coefficient of the material of the shaft (3).

6. The hollow magnet body with an annular auxiliary body according to claim 5, in which starting from one end face (6), the hollow magnet body (2) has an annular groove (8) in which the annular auxiliary body (9) is accommodated.

7. The hollow magnet body according to claim 5, in which the hollow magnet body (2), by means of the annular groove (8), forms a longitudinal section (L1) that is embodied in the form of a tubular section (10) that is press fit onto the shaft (3).

8. The hollow magnet body according to claim 7, in which in a vicinity of the longitudinal section (L1), the tubular section (10) has at least one radial slit (12, 13) passing through the tubular section.

9. The hollow magnet body with an annular auxiliary body according to claim 5, in which the hollow magnet body (2a) is embodied as an injection molded body that contains the annular auxiliary body (9a) as a reinforcing element.

* * * * *

UNITED STATES PATENT AND TRADEMARK OFFICE
CERTIFICATE OF CORRECTION

PATENT NO.    : 6,373,365 B1
DATED         : April 16, 2002
INVENTOR(S)   : Walter Haussecker et al.

It is certified that error appears in the above-identified patent and that said Letters Patent is hereby corrected as shown below:

<u>Title page,</u>
Item [30], should read as follows:
-- [30]  Foreign Application Priority Data
May 27, 1998  (DE) .............................1 98 23 640 --

Signed and Sealed this

Twenty-fourth Day of September, 2002

Attest:

Attesting Officer

JAMES E. ROGAN
Director of the United States Patent and Trademark Office